Jan. 24, 1967   J. C. STILES ET AL   3,299,716
FLUID ROTOR GYRO

Filed Sept. 18, 1962   3 Sheets-Sheet 1

JOHN C. STILES
WALTER M. CAROW
INVENTORS

BY S.A. Giarratana

Francis L. Masselle
ATTORNEYS

JOHN C. STILES
WALTER M. CAROW
INVENTORS

BY S. A. Giarratana

ATTORNEYS

Jan. 24, 1967 J. C. STILES ET AL 3,299,716
FLUID ROTOR GYRO
Filed Sept. 18, 1962 3 Sheets-Sheet 3

JOHN C. STILES
WALTER M. CAROW
INVENTORS

BY S.A. Giarratana

ATTORNEYS

United States Patent Office 3,299,716
Patented Jan. 24, 1967

3,299,716
FLUID ROTOR GYRO
John C. Stiles, Morristown, and Walter M. Carow, West Orange, N.J., assignors to General Precision Inc., Little Falls, N.J., a corporation of Delaware
Filed Sept. 18, 1962, Ser. No. 224,458
11 Claims. (Cl. 74—5.6)

The present invention relates to gyroscopes, and more particularly to a rate gyroscope in which the inertia element comprises a body of fluid within a rotating cavity.

Prior to the present invention, a typical rate gyro employed a spinning wheel within a framework mounted on bearings to an outer housing and constrained by a spring to be aligned with the outer housing. This provided a second order system which required the application of damping.

In accordance with one embodiment of the present invention, a reliable rate gyro having two input axes is provided by partly filling an enlarged spherical cavity in a shaft with a fluid which is thrown radially outwardly by centrifugal force in response to rotation of the shaft so that it forms an annulus around the equator of the cavity. Normally the axis of rotation of the fluid will coincide with the axis of rotation of the shaft; however, since the fluid has inertia it tends to lag behind the shaft when the gyro is rotated about a diameter so that an angle will develop between the fluid spin axis and the shaft spin axis. This imposes a viscous torque on the fluid which is proportional to the angular velocity between the fluid and the shaft, and the torque acts in such a way as to cause the fluid to precess in the direction of the shaft motion. With a steady state input, an angle will exist between the fluid spin axis and the shaft spin axis which is directly proportional to the input angular velocity so that the device of the present invention operates as a rate gyro. The usual spring in prior art rate gyros is replaced by the viscous coupling between the fluid and the spherical cavity, and the device is inherently a first order system which does not require damping.

Accordingly, it is one object of the invention to provide a simple and reliable rate gyro having two input axes.

It is another object of the invention to provide a two axis gyro using fluid as the inertia element.

It is a still further object of the invention to provide a rate gyro using fluid within a rotating cavity as an inertia element and taking advantage of the viscous drag between the fluid and the wall of the cavity to provide the equivalent of the restraining element used in prior rate gyro configurations.

It is a still further object of the invention to provide a two axis fluid rotor gyro comprising a rotating cavity partially filled with a conducting fluid, such as mercury, with two semi-circular bands of resistive material embedded in the wall of the cavity, each of the bands in effect providing a potentiometer with the mercury rotor serving as the slider to provide an electrical output proportional to the angular displacement between the spin axis of the mercury and the spin axis of the cavity.

It is a still further object of the invention to provide a two axis gyro having a fluid rotor which is inherently balanced so that it has a high degree of immunity from the effects of acceleration, vibration and shock, no bearings to wear and no way in which its mass can shift in the presence of acceleration.

It is a still further object of the invention to provide a fluid rotor gyro which is free of all hysteresis and stiction, and has no mechanical "memory," since it must flow in response to all forces.

It is a still further object of the invention to provide a two-axis fluid rotor rate gyro which does not require damping and eliminates the need for springs, bearings and other complexities of prior rate gyros.

It is a still further object of the invention to provide a two-axis fluid rotor rate gyro having an operation described by a first order differential equation rather than a second order equation which means that the gyro has no resonant frequency and therefore no resonant rise or damping ratio.

It is a still further object of the invention to provide a fluid rotor gyro which is simple in construction, very small and compact, extremely long-lived, more reliable than a single axis gyro and having approximately half the number of parts as two single axis gyros.

Other objects and features of novelty of the present invention will be specifically pointed out or will otherwise become apparent when referring, for a better understanding of the invention, to the following description taken in conjunction with the accompanying drawings, wherein.

Figure 1:
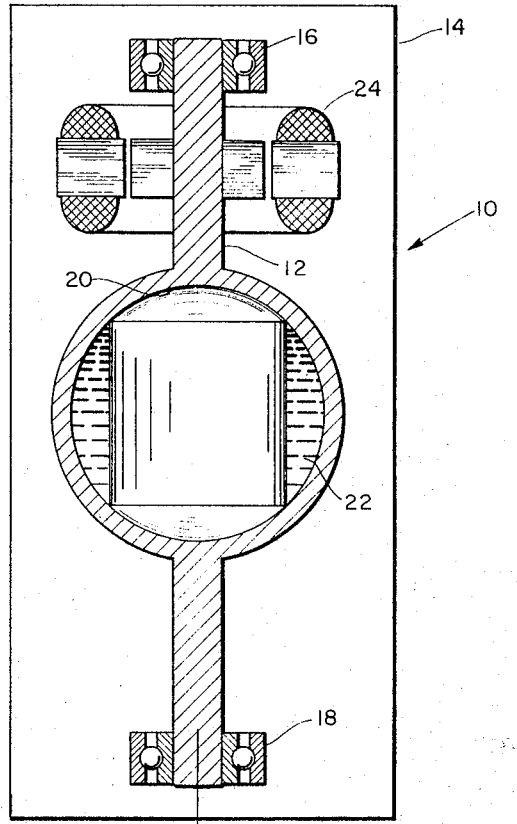
FIG. 1 is a sectional view of a gyroscope embodying features of the present invention.
Figure 2:
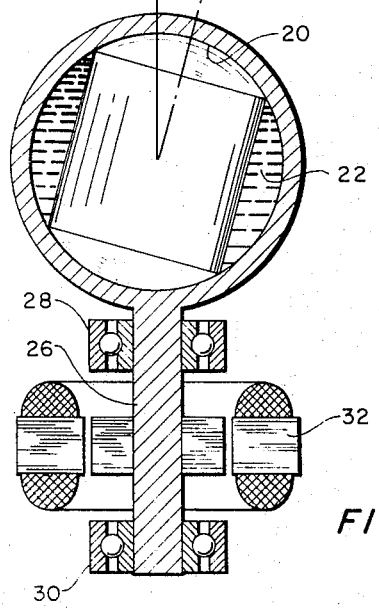
FIG. 2 is a sectional view of a modification of the invention.

Referring to FIG. 1, a fluid rate gyro 10 is illustrated which embodies features of the present invention. It comprises a shaft 12 rotatably journaled on a support 14 by a pair of ball bearings 16 and 18. An enlarged spherical cavity 20 is formed in the shaft intermediate the ends thereof and is partly filled with a viscous fluid 22 which forms an annulus around the equator of the cavity when the shaft is rotated by a spin motor 24 coaxially mounted about one end of the shaft. A slightly different embodiment of the invention is illustrated in FIG. 2 wherein the enlarged spherical cavity 20 is mounted on the end of a shaft 26 which is rotatably journaled by axially spaced ball bearings 28 and 30, a spin motor 32 being mounted between the bearings to rotate the shaft so that the fluid 22 therein is formed into the annulus, as previously described. However, it will be observed in FIG. 2 that the spin axis 34 of the fluid is angularly displaced from the spin axis 36 of the shaft. Normally the spin axis of the fluid will coincide with the spin axis of the shaft as in FIG. 1, but since the fluid has inertia it will tend to lag behind when the shaft is caused to rotate about a diameter so that an angle will develop between the spin axes, as in FIG. 2, to impose a viscous torque on the fluid which is proportional to the angular velocity between the fluid and the shaft. This torque will act in such a way as to cause the fluid to precess in the direction of the angular motion of the shaft about the diameter thereof. With a steady state input, the angle between the fluid spin axis and the shaft spin axis is directly proportional to the input angular velocity at which the shaft is rotated about a diameter. Thus the embodiments illustrated in FIGS. 1 and 2 function as a simple rate gyro in which the usual spring is replaced by the viscous coupling between the fluid and the spherical cavity.

Figure 3:
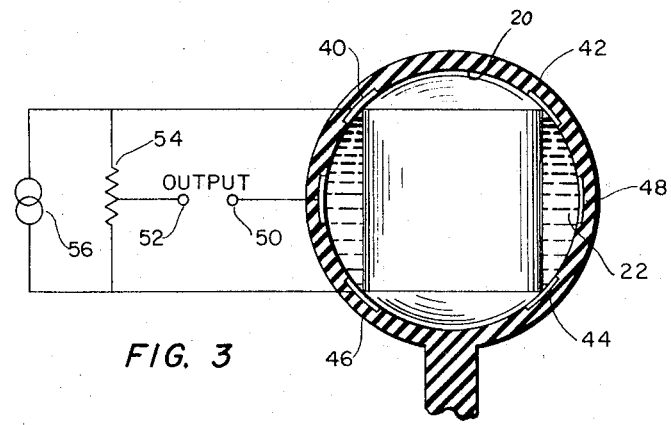
FIG. 3 is a fragmentary sectional view of the structure illustrated in FIG. 2 with an electrolytic pickoff added.

Various types of pickoffs can be used for measuring the angle between the fluid spin axis and the shaft spin axis. By way of example, the fluid can be an electrolyte and suitable spot electrodes 40, 42, 44, 46 can be embedded in the wall of the cavity along with a ring electrode 48 as illustrated in FIG. 3. The ring electrode is connected to one output terminal 50 and the other output terminal 52 is connected to a tap on a resistor 54 having a source of A.C. power 56 connected thereacross. The spot electrodes 40 and 42 are connected to the upper end of the resistor 54 and the spot electrodes 44 and 46 are connected to the lower end thereof. In this embodiment, cavity 22 is formed of a non-conductive material so as to isolate electrically the various electrodes 40, 42, 44, 46, 48. With this arrangement, angular displacement of the spin axis of the fluid with respect to the spin axis of the cavity will cause changes in the relative resistance between electrodes so as to provide an electrical output signal at the terminals 50 and 52 proportional to the angular displacement of the fluid spin axis relative to the shaft spin axis.

Figure 4:
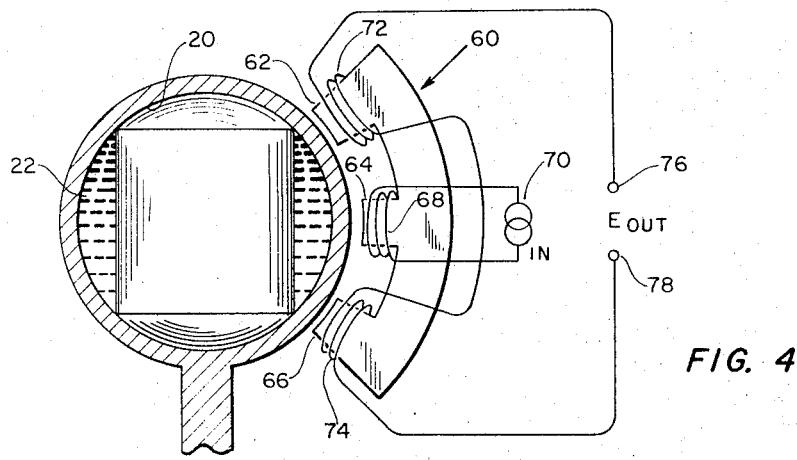
FIG. 4 is a fragmentary sectional view similar to that of FIG. 3 with a magnetic pickoff.

Another way of measuring the angle between the spin axes is illustrated in FIG. 4 wherein the fluid 22 is a magnetic fluid provided by suspending an iron slurry in a suitable oil. The position of the magnetic fluid is determined by a conventional E-bridge 60 having three interconnected cores 62, 64 and 66 closely overlying the outer wall of the cavity 20. The center core 64 is positioned at the equator of the cavity and the outer cores 62 and 66 are positioned to overlie the upper and lower periphery of the fluid annulus when it is in its null position, that is when its spin axis coincides with the spin axis of the shaft. A coil 68 is positioned about the center core 64 and energized by an A.C. input source 70. Interconnected coils 72 and 74 are positioned about the outer cores 62 and 66, respectively, and connected to voltage output terminals 76 and 78, respectively. In this embodiment, cavity 20 is formed of a non-magnetic material so as not to shunt the magnetic path provided by fluid 22. With this arrangement, a voltage output will appear at the terminals 76 and 78 which is proportional to the angular displacement between the spin axes.

Figure 5:
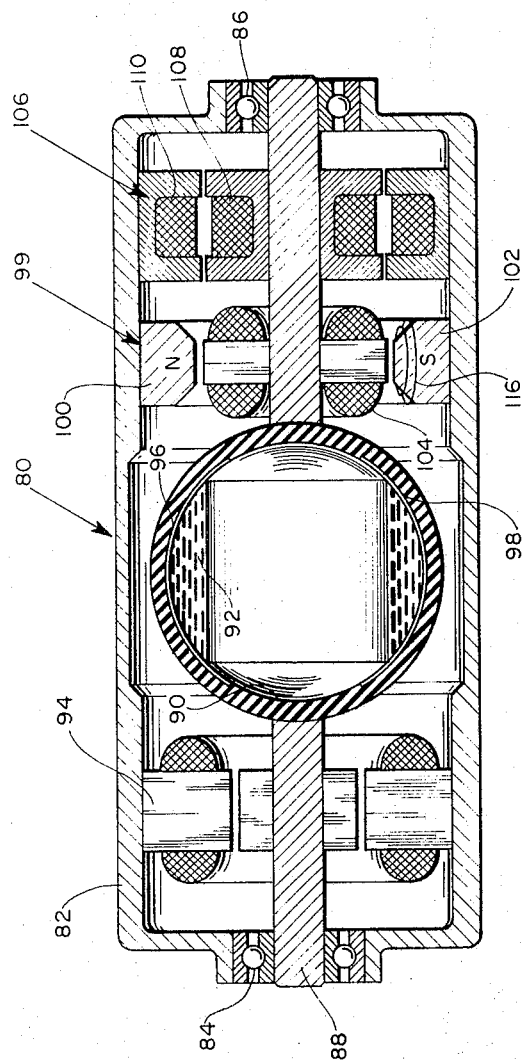
FIG. 5 is a sectional view of still another embodiment of the invention.

Another embodiment of the invention is shown in FIG. 5. It comprises a gyro 80 having a cylindrical housing 82 with ball bearings 84 and 86 in the ends thereof for rotatably supporting a shaft 88 extending through the housing 82 along the axis thereof. A spherical cavity 90 is formed intermediate the ends of the shaft 88 as before, and partially filled with a conducting fluid 92, such as mercury, for example, which forms the annulus as previously described when the shaft 88 is rotated by a spin motor 94. A typical centrifugal acceleration in the mercury rotor would be 2000 g's.

A pair of semi-circular bands 96 and 98 of resistive material are attached to or embedded in the wall of the cavity 90 to provide a potentiometer with the mercury rotor serving as the slider. In the absence of any input rates, centrifugal force will cause the mercury to form an annulus symmetrically disposed about the equator of the rotating cavity, so that its spin axis closely coincides with the spin axis of the shaft. If the gyro is now suddenly displaced through a small angle, the mercury rotor will tend to continue rotating in the same plane because of its inertia. Since the rotor is no longer rotating about the same axis as the cavity, there exists an angular velocity between the two so that the rotor can be regarded as being coupled to the cavity wall through its own viscosity and therefore the aforementioned viscous torque will be imposed on the rotor proportional to the differential angular velocity. As previously described, this torque acts in such a way as to precess the mercury rotor to reduce the differential velocity to zero, that is to cause the rotor to precess to align its spin axis with the spin axis of the cavity. If a steady state input rate is applied to the device as previously described, the spin axis of the fluid rotor will be displaced from the spin axis of the cavity by a small angle proportional to the input rate.

Figure 6:
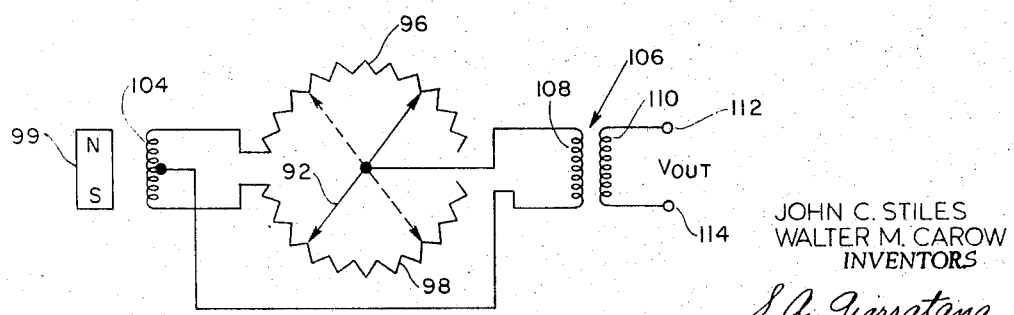
FIG. 6 is a schematic diagram of the electrical circuit used with the embodiment of FIG. 5.

As further illustrated in FIG. 5, the angle between the spin axes can be detected by fixing a magnet 99 in the housing 82 about a coil 104 rotating with the shaft 88. This coil cuts the magnetic field between the circumferentially spaced north and south poles 100 and 102 of the magnet to induce an A.C. voltage in the coil 104 which is applied to the resistive bands 96 and 98 as illustrated schematically by the circuit shown in FIG. 6. As already described, the resistive bands form potentiometers with the mercury rotor acting as a slider which is at a voltage proportional to its angle off null. The A.C. voltage induced in the coil 104 by the permanent magnet 99 is sampled by the mercury rotor 92 which oscillates back and forth as shown in FIG. 6 with an amplitude proportional to the input rate and a phase lag proportional to the input direction. The voltage of the mercury rotor is brought out of the gyro through a rotary transformer 106 having a rotary coil 108 fixed to the shaft 88 and a stator coil 110 fixed to the housing 82. A voltage appears at coil 108 proportional to the mercury rotor displacement, and since the coil 110 has a constant coupling with the coil 108, the output voltage at the terminals 112 and 114 is proportional to the input rate to the gyro and has a phase angle equal to the angles between the vector of the input rate and the axis of the magnet 99. A reference signal to detect this phase can be generated by winding a coil 116 around one of the circumferentially spaced poles of the magnet 99.

The gyroscope can also be instrumented to produce two signals, each proportional to one of two orthogonal components of the input rate, e.g., pitch and roll. This can be accomplished by making the rotary transformer 106 with an air gap which varies in such a way as to make the transformation ratio proportional to the shaft angle. Two transformers would then be required, one for each axis. In the embodiment illustrated in FIG. 5, a constant unidirectional magnetic flux from the permanent magnet 99 is put into the gyroscope and an A.C. signal is taken out. If desired, this can be reversed by putting a fluctuating A.C. magnetic field in and bringing out a D.C. current proportional to the components of the input rate. This would require two slip-rings, which could be of the mercury-wetted button type, one on each end of the shaft.

The embodiments described above have many advantages. First of all, they have a high degree of immunity from the effects of acceleration, vibration and shock. The fluid rotors are inherently balanced, have no bearings to wear, and there is no way in which the masses thereof can shift. The gyros, therefore, will not produce error signals in the presence of acceleration. With a centrifugal acceleration of 2000 g's. on the rotor, the effect of acceleration along the spin axis is to cause the inner surface of the fluid rotor to form a cone with an angle given by the ratio of the input acceleration to 2000. For reasonable accelerations, this will result in a negligible angle, and in any event will not produce any net output in the embodiment of FIG. 5, for example, because of the symmetry of the resistive bands 96 and 98. The gyro should be free to all hysteresis and stiction and the fluid rotor has no mechanical "memory" since it must flow in response to all forces.

The life of the gyro can be expected to be very long, because the ball bearings, not being part of the sensitive element, can be made as large, as lightly loaded, and as well lubricated as desired. They also can be made accessible from the outside to enable the lubrication to be replenished, if necessary, or, for extremely long life, they can be replaced by hydrodynamic gas bearings. Further, the gyro can be made quite compact. For example, it can be built with the same case dimensions as present miniature rate gyros, namely, an inch in diameter and two inches long. Since a gyro constructed in accordance with the present invention is a two-axis device, its size and weight per axis is cut by one-half, and it can be expected to be more reliable than prior devices since it has approximately half the number of parts of two single axis gyros. Its cost per axis is likewise reduced by one-half. Finally, its operation is described by a first order differential equation rather than a second order equation. This means that it has no resonant frequency and therefore no resonant rise or damping ratio.

Since the plane of rotation of the annular fluid rotors differs from that of the cavity at most by one or two degrees, a completely spherical cavity need not be employed. Only those portions of the cavity which actually come in contact with the fluid need be made spherical, and the remainder of the cavity may be non-spherical. Therefore a device could be made with a through shaft having a web leading out to a semi-spherical cavity very little larger than the fluid it contains.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims. For example, although the fluid rotor is particularly well suited for rate gyro applications, it also can be used for free gyro applications by providing a tight servo loop for slaving the spin axis of the casing to the spin axis of the fluid rotor. Error angles will exist, but these can be made small by a tight servo loop and also by employing fluids of low viscosity to minimize the viscous coupling effect.

What is claimed is:

1. A gyroscope comprising a rotatable body having a cavity therein partly filled with a fluid, said fluid forming an annulus within said cavity when said body is rotated, said annulus having axially-spaced, circular, circumferential edges defined by the junction of the internal and external surfaces of the annulus, and electrical pickoff means coacting with the circumferential edges of the annulus to indicate displacement between the spin axis of said body and the spin axis of said annulus.

2. The invention as defined in claim 1 wherein at least the portion of said cavity occupied by said annulus is spherical.

3. The invention as defined in claim 1 wherein said fluid is an electrolyte and said pickoff means comprises electrode means for detecting the position of said electrolyte.

4. The invention as defined in claim 1 wherein said fluid is a magnetic fluid and said pickoff means comprises magnetic means for detecting the position of said magnetic fluid.

5. A gyroscope comprising a shaft having an enlarged cavity therein partly filled with fluid, bearing means for rotatably journaling said shaft, motor means for rotating said shaft to cause said fluid to form an annulus within said cavity initially having a spin axis closely coinciding with the spin axis of the shaft and cavity, said annulus having axially-spaced, circular, circumferential edges defined by the junction of the internal and external surfaces of the annulus, and electrical pickoff means coacting with the circumferential edges of the annulus to indicate displacement between said spin axes.

6. The invention as defined in claim 5 wherein at least the portion of said cavity occupied by said annulus is spherical.

7. A gyroscope comprising a housing, bearing means mounted on said housing, a shaft having an enlarged cavity therein rotatably journaled within said housing by said bearing means, a fluid partly filling said cavity, motor means within said housing for rotating said shaft to cause said fluid to form an annulus within said cavity, said annulus having axially-spaced, circular, circumferential edges defined by the junction of the internal and external surfaces of the annulus, and electrical pickoff means coacting with the circumferential edges of the annulus to indicate displacement between the spin axis of the annulus and the spin axis of said cavity.

8. A gyroscope comprising a cylindrical housing having axially spaced end walls, coaxially aligned bearing means mounted on said end walls, a shaft rotatably journaled within said housing by said coaxially aligned bearing means and having an enlarged cavity therein intermediate the ends thereof, a fluid partly filling said cavity, spin motor means within said housing coaxially mounted about said shaft to rotate the shaft to cause said fluid to form an annulus within said cavity, said annulus having axially-spaced, circular, circumferential edges defined by the junction of the internal and external surfaces of the annulus, and electrical pickoff means coacting with the circumferential edges of the annulus to indicate displacement between the spin axis of said annulus and the spin axis of said cavity defined by said coaxially aligned bearing means.

9. A gyroscope comprising a rotatable body having a cavity therein partly filled with an electrically conducting fluid, said fluid forming an annulus within said cavity when said body is rotated, and pickoff means for indicating displacement between the spin axis of said body and the spin axis of said annulus, said pickoff means including resistor means on the wall of said cavity in position to be engaged by a circumferential edge of said annulus whereby said edge of the annulus acts as a potentiometer slide.

10. The invention as defined in claim 9 wherein said pickoff means comprises a pair of semi-circular resistors fixed on the wall of said cavity in diametrically opposed relation and extending substantially parallel to the spin axis of the casing, and electrical means connected to said resistors and annulus for energizing them in a manner to operate as a potentiometer slide arrangement for indicating the position of said annulus.

11. A gyroscope comprising a housing, a shaft rotatably journaled within said housing and having an enlarged cavity thereon, an electrically conducting fluid partly filling said cavity, a spin motor mounted within said housing for rotating said shaft to cause said fluid to form an annulus within said cavity, a pair of diametrically opposed semi-circular resistors fixed on the wall of said cavity substantially parallel to the spin axis thereof, a rotary coil mounted on said shaft and electrically connected to said resistors, permanent magnet means surrounding said rotary coil for inducing an A.C. voltage in said rotary coil, a rotary transformer within said housing having the stator thereof fixed to the housing and the rotor thereof fixed to said shaft, said rotor being connected between said conducting fluid and a tap on said rotary coil whereby a voltage appears across the stator of said rotary transformer proportional to the displacement of the spin axis of said annulus.

References Cited by the Examiner

UNITED STATES PATENTS

| | | | |
|---|---|---|---|
| 3,058,359 | 10/1962 | Wing | 74—5.6 |
| 3,060,751 | 10/1962 | Stoddard | 74—5 |
| 3,142,991 | 8/1964 | Pittman | 74—5.6 X |

FRED C. MATTERN, JR., *Primary Examiner.*

BROUGHTON G. DURHAM, *Examiner.*

K. J. DOOD, P. W. SULLIVAN, J. PUFFER,
*Assistant Examiners.*